US006408298B1

(12) United States Patent
Van et al.

(10) Patent No.: US 6,408,298 B1
(45) Date of Patent: Jun. 18, 2002

(54) METHODS AND SYSTEMS FOR COPYING AND MOVING ACROSS VIRTUAL NAMESPACES

(75) Inventors: Van C. Van, Kirkland; Joel M. Soderberg, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/461,916

(22) Filed: Dec. 15, 1999

(51) Int. Cl.$^7$ .............................................. G06F 17/30
(52) U.S. Cl. ...................................................... 707/10
(58) Field of Search ....................... 707/10, 2; 709/203, 709/223; 345/854

(56) References Cited

U.S. PATENT DOCUMENTS 6,067,545 A * 5/2000 Wolff ........................... 707/10
6,101,508 A * 8/2000 Wolff ......................... 707/218
6,256,031 B1 * 7/2001 Meijer et al. ................ 707/203

OTHER PUBLICATIONS

A. Guruprasad, V. (IEEE publication) discloses Who needs addresses? –BM Thomas J. Watson Res. Center, Yorktown Heights, NY, USA This paper appears in: Universal Multiservice networks, 2000. ECUMN 2000. 1st European Conference; pp.:403–413 2–4 O.*

* cited by examiner

Primary Examiner—Diane D. Mizrahi
(74) Attorney, Agent, or Firm—Workman, Nydegger, Seeley

(57) ABSTRACT

A method is described for moving a collection of resources from a source virtual namespace to a destination virtual namespace. For example, the method could copy or move the files within a URI directory "http://server/dir1/" to a new URI directory "http://server/newdir1" using a single copy or move request. In response to an appropriate request, the computer system the computer system performs the following acts for the parent directory and then for those subdirectories at any level underneath the parent directory. For each directory, the computer system determines the physical namespace (e.g., file system path) that corresponds to the virtual namespace of that directory. This is performed for both the directory in the source virtual namespace and the corresponding directory in the destination virtual namespace. Next, the files are copied from the directory of the source physical namespace to the directory of the destination physical directory. In a move operation, the files within that source directory are deleted at some point after being copied. The method allows a user to treat the Internet as a readable and writable medium organized in a tree-like directory structure and allows copying or moving in a single request across the directory structure.

28 Claims, 5 Drawing Sheets

| VIRTUAL DIRECTORY | PHYSICAL NAMESPACE |
|---|---|
| http://server/dir1/ | C:\main\directory1\ |
| http://server/ | E:\root\ |
| http://server/dir1/subdir1/ | G:\sample\ |
| http://server/newdir1/subdir1/ | G:\sample\stuff\info\ |
| http://server/newdir1/subdir3/ | C:\ |

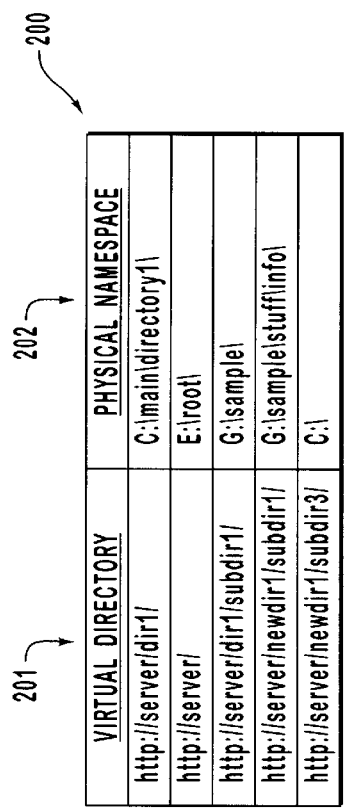
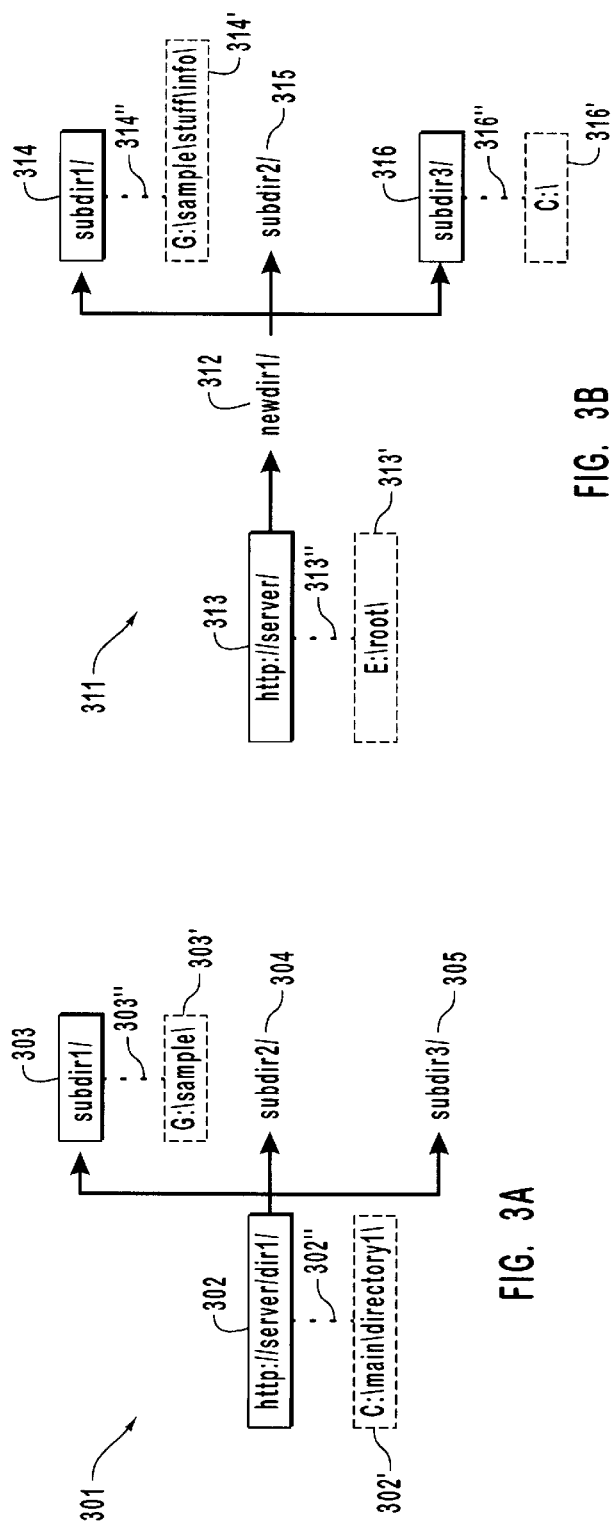
FIG. 2
FIG. 3A
FIG. 3B

METHODS AND SYSTEMS FOR COPYING AND MOVING ACROSS VIRTUAL NAMESPACES

CROSS-REFERENCE TO RELATED APPLICATIONS

The present application is related to U.S. pending patent application Ser. No. 09/360,776, filed Jul. 26, 1999 and entitled "Methods and Systems for Processing HTTP Requests" which is incorporated herein by reference. The present application is also related to U.S. pending patent application Ser. No. 09/360,515, filed Jul. 26, 1999 and entitled "Accessing Sources of Resources Within Standard Request-Response Protocols" which is also incorporated herein by reference.

BACKGROUND OF THE INVENTION

1. The Field of the Invention

The present invention relates to electrical computers and data processing systems. Specifically, the present invention relates to methods and systems for copying and moving across virtual namespaces, and in particular copying and moving entire directory structures across virtual namespaces such as a Uniform Resource Identifier or URI.

2. The Prior State of the Art

One of the main utilities of computers is the ability to store files of information on a medium and then retrieve that file from the medium as needed. Such mediums might include, for example, an optical medium such as a CD-ROM, or a magnetic medium such as a tape inserted in a tape drive or a magnetic disk embedded within a magnetic disk drive. The mediums are typically divided into many individually addressed memory locations or sectors where a file or a portion of a file may be stored.

There are an endless variety of files that may be stored on such mediums including text files, image files, sound files, executable files, and so forth. Typically, a file system identifies the location of a file by mapping a "physical namespace" to one or more physical sector addresses so that the file can be effectively retrieved on demand. Thus, a file can be said to reside at a physical namespace. In this application, the term "physical namespace" is defined as a string of characters that directly represents a physical location on a computer.

In a conventional file system, a tree-like directory structure is used to organize files. A "path" along that tree defines the physical namespace of the file. An example of a file path in the MS-DOS® operating system is "C:\maindir\subdirectory\file.extension wherein "C:\" represents volume name, "maindir" represents an optional main directory, "subdirectory" represents an option subdirectory structure, "file" represents the name of the file, and "extension" represents an extension to the file indicative of the content type of the file. Similarly, a directory within the directory tree can also have a physical namespace similar to the file physical namespace except that no file or extension is specified. Hereinafter, the term "resource" will be used to describe both files and directories.

It is often useful to copy a resource such as a file or directory from one physical namespace to another. A copy operation for a single file involves reading the file from a source physical namespace, and then writing the file to the destination physical namespace. A copy operation for an entire directory involves reading a file from the source physical namespace and then writing that file to the destination physical namespace one file at a time until all files from the source physical namespace are copied into the destination physical namespace. A move operation is essentially the same as a copy operation except that the resource at the source physical namespace is deleted at some point after it is read.

Recently, a technology called WEBDAV or "WEB Distributed Authoring and Versioning" has turned the Internet into a collaborative, writable medium such that resources can be copied and moved across uniform resource identifiers or URIs, not just across physical namespaces such as file system paths. According to proper WEBDAV usage, in the "MOVE" and "COPY" methods, a file is to be transferred from one URI to another URI. In addition, a directory or "collection" of resources is to be transferred from one URI directory to another URI directory. There are significant problems associated with transferring a collection of resources from one virtual namespace to another virtual namespace. These problems will be described in the following detailed description of the invention.

In light of the prior art, what are desired are methods and systems for copying and moving directories or "collections" of virtual namespaces across virtual namespaces.

SUMMARY OF THE INVENTION

The present invention relates to a method and system for copying or moving a collection of resources from a source virtual namespace to a destination virtual namespace. These virtual namespaces may be, for example, Uniform Resource Identifiers or URIs that are commonly used to identify Internet and Intranet resources. In this case, the collection of resources would be a directory within the URI. For example, the method could copy or move the files within the URI directory "http://server/dir1/" to a new URI directory "http://server/newdir1".

These virtual namespaces correspond to physical namespaces where the files are physically stored. An example of a physical namespace might be a file system path. Sometimes, the source or virtual namespace directory structure will correspond to non-contiguous physical namespaces. For example, the virtual namespace "http://server/dir1/" may correspond to a physical namespace of "C:\main\directory1\", while one of the subdirectories of the virtual namespace such as "http://server/dir1/subdir1/" corresponds to an entirely different physical namespace "G:\sample\". Thus, the directory hierarchy of the virtual namespaces does not necessarily follow the directory hierarchy of the physical namespaces.

The computer system receives a request to copy or move a collection of resources from the source virtual directory corresponding to one or more physical namespaces to a destination virtual directory corresponding to one or more physical namespaces. In response to this request, the computer system performs the requested copy or move operation.

In order to copy or move the collection, the method performs the following acts for the parent directory and then for those subdirectories at any level underneath the parent directory. If security permission is not granted for a certain subdirectory, copying and moving will not occur for that subdirectory. For each directory, the computer system determines the physical namespace that corresponds to the virtual namespace of that directory. This may involve looking up the physical namespace in a table if the virtual namespace of that directory is directly mapped to a physical namespace. Otherwise, the physical namespace may be determined by removing one directory at a time from the right hand side of the virtual namespace until a virtual namespace is found for which there is a direct mapping in the table to a physical namespace. Then the subdirectories removed are added back to the right hand side of the physical namespace to obtain the physical namespace for that directory. This process is performed for both the directory in the source virtual namespace and the corresponding directory in the destination virtual namespace. Next, the files are copied from the directory of the source physical namespace to the directory of the destination physical directory. In a move operation, the files within that source directory are deleted after copying.

In the entire method, only the virtual namespaces are exposed to the entity making the copy or move request. In implementation, the computer system may need to translate this copy or move requests into several physical namespace copy or move requests since the physical namespaces corresponding to a virtual namespace may not be contiguous. The method allows a user to treat the Internet as a readable and writable medium organized in a tree-like directory structure. File systems enable users to move files from one physical namespace to another physical namespace using a single command. The method of the present invention permits the same over the Internet using URIs.

Additional advantages of the invention will be set forth in the description which follows, and in part will be obvious from the description, or may be learned by the practice of the invention. The advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 schematically illustrates a data structure that directly maps virtual directories of virtual namespaces to corresponding physical namespaces to enable the determination of the physical namespace from the virtual namespace;

FIG. 3A schematically illustrates a tree-like directory subdirectory hierarchy for an example source directory virtual namespace tree with direct mappings to physical namespaces as defined in FIG. 2 also shown;

FIG. 3B schematically illustrates a tree-like directory subdirectory hierarchy for an example destination directory virtual namespace tree with direct mappings to physical namespaces as defined in FIG. 2 also shown;

DETAILED DESCRIPTION OF THE PREFERRED EMBODIMENTS

Figure 1:
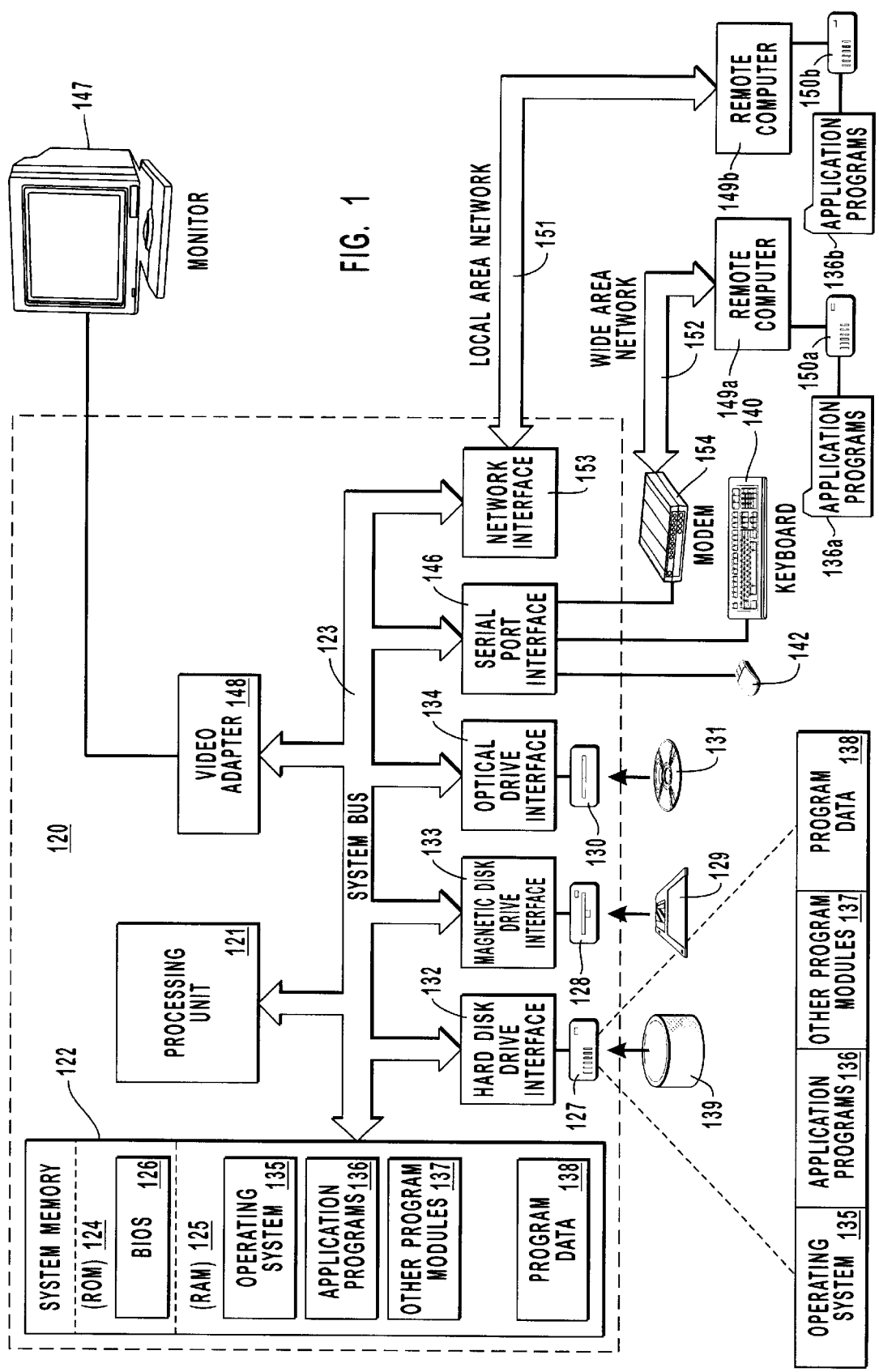
FIG. 1 schematically illustrates a suitable operating environment for the present invention.

In accordance with the present invention, a method and system are described for copy and moving resources, particularly "collections" which are groups or directories of resources, from a source virtual namespace such as "http://server/dir1/" to a destination virtual namespace such as "http://server/newdir1/". This copying and moving is possible in accordance with the principles of the present invention even if one or both of the source and destination virtual namespaces with their child subdirectories correspond to non-contiguous physical namespaces. Several terms will be used frequently throughout this description and in the claims. These terms are first described.

A "physical namespace" means any string of characters that directly represents a physical location on a computer. For example, a file system path such as "c:\main\directory1\" is a physical namespace. Although the file system path is used as the physical namespace in the specific examples described in this description, other examples of physical namespaces include a database entry, a registry setting, an electronic mail message, and so forth.

A "virtual namespace" means a string of characters that indirectly represents a location on a computer only by referring to an information source that correlates the string of characters to a corresponding physical namespace. A virtual namespace cannot be used to retrieve information until the virtual namespace is converted into a corresponding physical namespace. In an HTTP environment, a virtual namespace such as a Uniform Resource Identifier (URI) is exposed to clients. The details of what physical namespaces the virtual namespace maps to are not exposed to the client.

A "virtual directory" means a directory of a virtual namespace that maps directly to a physical namespace where the mapping does not follow the directory hierarchy structure of the physical namespaces. For example, suppose that the virtual namespace "http://server/" maps to the physical namespace "E:\root\". Suppose further that the virtual namespace "http://server/dir1/" maps to "C:\main\directory1\". In this case, the directory namespace "http://server/dir1/" is a virtual directory that does not follow the directory hierarchy structure of the physical namespace. In other words, the directory namespace "http://server/dir1/" does not map to the physical directory "E:\root\dir1\" as one might expect if it followed the directory hierarchical structure of the physical namespaces. Virtual directories are described in further detail in co-pending U.S. pending patent application Ser. No. 09/360,776, filed Jul. 26, 1999 and entitled "Methods and Systems for Processing HTTP Requests" which is incorporated herein by reference. Note that "virtual directories" are not the same as "virtual namespaces."

A "physical directory" means a directory of a virtual namespace that follows the directory hierarchy structure of the physical namespaces. For example, suppose that the virtual namespace "http://server/" maps to the physical namespace "E:\root\". Suppose further that the virtual namespace "http://server/dir1/" maps to "E:\root\dir1\". In this case, the directory namespace "http://server/dir1/" is a physical directory that follows the directory hierarchy structure of the physical namespace. In other words, the string "dir1" is added to the parent directory to obtain the physical directory in both the virtual namespace structure and the physical namespace structure.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding specific acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically includes many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

A computer system such as the computer 120 of FIG. 1 may operate to implement the features of the present invention. Specifically, the computer 120 may copy or move a directory of a virtual namespace to another virtual namespace. In this description, a specific example of a move operation is described in which the source directory virtual namespace "http://server/dir1/" is moved to a destination directory virtual namespace "http://server/newdir1/". An advantage of the present invention is that the complexities behind this copy or move operation are hidden from the user.

Only the virtual namespaces are exposed to the user. Thus, a user need only perform the relatively simple task of issuing the request to copy or move from the source directory virtual namespace to the destination directory virtual namespace. The hereinafter-described method is performed in response to receiving such as request.

As mentioned above, the present invention relates to the copying and moving of directory virtual namespaces across virtual namespaces. Since the mechanisms such as file systems that actually do the physical copying and moving recognize physical namespaces and not virtual namespaces, the directory virtual namespaces must at some point be converted to a corresponding physical namespace. Accordingly, embodiments within the scope of the present invention includes a means or step for determining physical namespaces corresponding to virtual namespaces as hereinafter described.

FIG. 2 is a schematic table diagram of a data structure 200 that correlates virtual directories to corresponding physical namespaces. This data structure is stored in a memory such as magnetic hard disk 139, removable magnetic disk 129 or removable optical disk 131 of FIG. 1. Recall that virtual directories are directories of a virtual namespace that maps directly to a physical namespace where the mapping does not follow the directory hierarchy structure of the physical namespaces. The data structure 200 is used to perform the mapping of virtual directories of virtual namespaces to physical namespaces. The left column 201 lists the virtual namespaces of the virtual directories while the right column 202 lists the corresponding physical namespaces. Although physical directories of virtual namespaces may also be mapped to physical namespaces if desired, the data structure 200 does not perform such mapping. The determination of the physical namespace from the virtual namespace when the virtual namespace is a physical directory is described in detail with respect to FIG. 4.

FIG. 3A schematically illustrates the tree-like directory structure 301 of the example source directory virtual namespace "http://server/dir1/" 302. All the virtual directories such as the source directory virtual namespace "http://server/dir1/" 302 within the source directory structure are encased by a solid-lined box. Note that the files within each directory are not shown for clarity though each directory may indeed contain a number of files.

As seen in the first entry of the data structure 200 of FIG. 2, the virtual directory "http://server/dir1/" maps directly to the physical namespace "C:\main\directory1\". This physical namespace "C:\main\directory1\" is shown in FIG. 3A as element 302'. Also in FIG. 3A, a dotted line 302" drops down from the virtual directory 302 to the physical namespace 302' and represents the direct mapping between the virtual directory 302 and the physical namespace 302'.

A similar mapping relationship is shown for the other virtual directories in FIG. 3A with virtual directories encased within a solid-lined box, with physical directories enclosed in a dashed-lined box, and with the relationship between the two represented with a dotted line connecting the two. For example, as seen in FIG. 3A, virtual namespace "http://server/dir1/subdir1/" 303 is a virtual directory which maps to the physical namespace "G:\sample\" 303' through the direct mapping 303" as defined in the data structure 200 of FIG. 2.

Virtual namespaces such as virtual namespace "http://server/dir1/subdir2/" 304 and "http://server/dir1/subdir3/" 305 that represent physical directories which do not directly map to a physical namespace are shown without being encased in any box. These physical directories 304 and 305 lack a direct mapping relationship as indicated by their absence in the left column 201 of the data structure 200 of FIG. 2.

Figure 4:
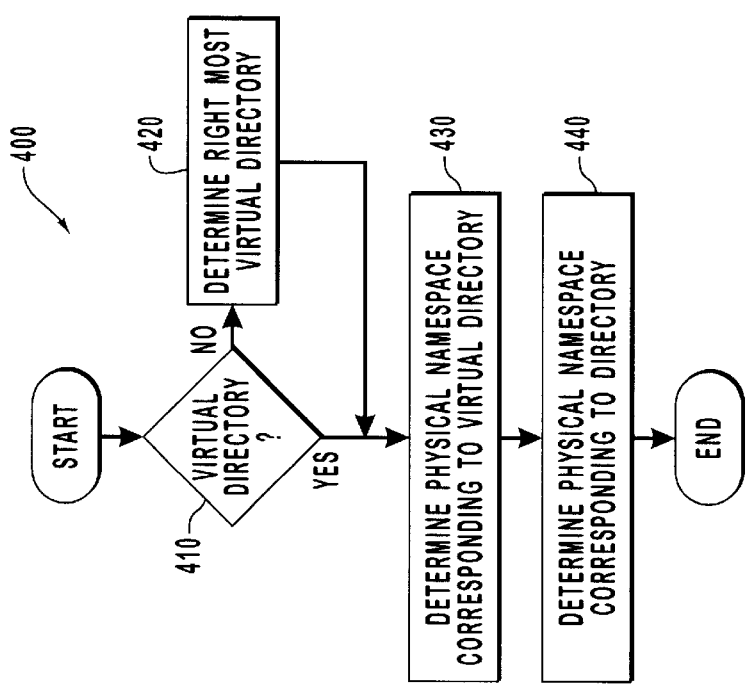
FIG. 4 is a flowchart of a method for determining a physical namespace corresponding to a virtual namespace whether that virtual namespace be a virtual directory or a physical directory.

However, the physical directories of the virtual namespaces still have a corresponding physical namespace even though they are not directly mapped to those physical namespaces. In the case of physical directories of virtual namespaces, the corresponding physical namespace is determined based on the virtual namespace by analyzing the virtual namespace right to left until a virtual directory is found. FIGS. 4 illustrate a flowchart of a specific method 400 for determining the corresponding physical namespace based on the virtual namespace.

Referring to FIG. 4, decision block 410 determines whether the virtual namespace is a virtual directory. Taking the physical directory "http://server/dir1/subdir2/" 304 as an example, the physical directory 304 is not a virtual directory (NO in decision block 410), thus step 420 determines the right most virtual directory in the virtual namespace 304. This may be accomplished by removing one subdirectory at a time from the right hand side of the virtual namespace until a virtual directory is encountered. Removing "subdir2/" from the virtual namespace 304 yields "http://server/dir1/" which is a virtual directory as indicated by its presence in the left column 201 of the data structure 200 of FIG. 2. Thus, "http://server/dir1/" is the right most virtual directory in the virtual namespace 304.

After step 420 determines the right-most virtual directory, step 430 determines the physical namespace corresponding to that virtual directory. This may be accomplished by referring to the right column 202 of the data structure 200 of FIG. 2 to determine that the physical namespace corresponding to the virtual directory "http://server/dir1/" is "C:\main\directory1\".

Next, step 440 determines the physical namespace of the directory itself. This may be done by adding back any subdirectories previously removed to obtain the virtual directory. The removed subdirectory was "subdir2/". Thus, the physical namespace corresponding to the virtual namespace "http://server/dir1/subdir2/" is "C:\main\directory1\subdir2\". A similar analysis may be performed to show that the virtual namespace "http://server/dir1/subdir3/" 305 has a corresponding physical namespace of "C:\main\directory1\subdir3\".

The method of FIG. 4 may also be used to determine the corresponding physical namespace for a virtual namespace when the virtual namespace is a virtual directory. In this case, decision block 410 determines that the virtual namespace is a virtual directory (YES in decision block 410). Next, step 430 determines the corresponding physical namespace for the virtual directory by reference to the data structure 200 of FIG. 2. Step 440 determines that the physical namespace is the physical namespace of the virtual directory determined in step 430.

Table 1 summarizes all of the directories of the source virtual namespace directory structure 301 with its corresponding physical namespace. Also included are columns for whether the virtual namespace is a virtual directory, and whether the virtual namespace is a physical directory. Note that each virtual namespace is either a virtual directory or a physical directory, but not both since virtual directories and physical directories are mutually exclusive by definition.

TABLE 1

| VIRTUAL NAMESPACE | PHYSICAL NAMESPACE | VIRTUAL DIRECTORY? | PHYSICAL DIRECTORY? |
|---|---|---|---|
| http://server/dir1/ | C:\main\directory1\ | Yes | No |
| http://server/dir1/subdir1/ | G:\sample\ | Yes | No |
| http://server/dir1/subdir2/ | C:\main\directory1\subdir2\ | No | Yes |
| http://server/dir1/subdir3/ | C:\main\directory\subdir3\ | No | Yes |

Note that the physical namespaces are not contiguous. In this description and in the claims, "contiguous" physical namespaces means physical namespaces that are contained within a common physical namespace directory with the common physical namespace directory being included as one of the contiguous physical namespaces. For example, the physical namespaces "C:\1\", "C:\1\A\", "C:\1\B\" and "C:\1\A\i\" are all contiguous since they are contained within the common physical namespace "C:\1\".

Figure 5A:
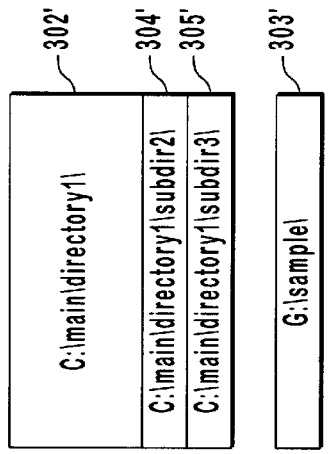
FIG. 5A schematically illustrates an example data structure that represents the physical namespaces corresponding to the example source directory of FIG. 3A.

The relationship of the physical namespaces of Table 1 is shown in FIG. 5A. The three physical namespaces 302', 304' and 305' of and within the directory "C:\main\directory1\" are contiguous. However, the physical namespaces, as a whole, are not contiguous since the physical namespace "G:\sample\" 303' is not within a common directory with the other physical namespaces 302', 304' and 305'.

Recall that in the example, the source directory virtual namespace "http://server/dir1/" is being moved to the destination directory virtual namespace "http://server/newdir1/". Up to this point, the structure of the source directory virtual namespace 301 has been discussed. Now, the structure of the example destination directory virtual namespace will be described. FIG. 3B illustrates the tree-like directory structure 311 of the example destination directory virtual namespace "http://server/newdir1/" 312. FIG. 3B also shows the virtual directories of the virtual namespace as being encased by a solid-lined box, the corresponding physical namespaces being encased by a dashed-lined box, and the physical directories of the virtual namespace without being encased by a box.

Since the destination directory virtual namespace 312 is a physical directory, its parent directory virtual namespace "http://server/" 313 is also shown so that the physical namespace of the destination directory virtual namespace "http://server/newdir1/" 312 can be properly derived. Note that the parent directory virtual namespace "http://server/" 313 is a virtual directory with a mapping 313" to the physical namespace "E:\root\" as apparent from the data structure 200 of FIG. 2. Following the method 400 of FIG. 4 described above, the physical namespace corresponding to the destination directory virtual namespace "http://server/newdir1/" would thus be "E:\root\newdir1\".

A virtual namespace "http://server/newdir1/subdir1/" 314 lies underneath the destination directory virtual namespace 312. If the virtual namespace "http://server/newdir1/subdir1/" were a physical directory, one would expect the corresponding physical namespace to be "E:\root\newdir1\subdir1\". However, the virtual namespace "http://server/newdir1/subdir1/" is a virtual directory which has a mapping 314" to a physical namespace "G:\sample\stuff\info\" 314' that is independent of the physical namespace directory hierarchy of its parent directory as defined by the data structure 200 of FIG. 2.

Another virtual namespace "http://server/newdir1/subdir2/" 315 lies underneath the destination directory virtual namespace 312. Since the virtual namespace "http://server/newdir1/subdir2/" 315 is a physical directory, its directory structure follows the directory structure of its parent directory. Thus, according to the method 400 of FIG. 4, its corresponding physical namespace is "E:\root\newdir1\subdir2\".

A last virtual namespace "http://server/newdir1/subdir3/" 316 also lies underneath the destination directory virtual namespace 312. Since the virtual namespace "http://server/newdir1/subdir3/" is a virtual directory, the mapping 316" corresponding physical namespace "C:\" 316' is obtained by reference to the data structure 200 of FIG. 2.

Table 2 summarizes all of the directories of the destination virtual namespace directory structure 311 with their corresponding physical namespace. Also included are columns for whether the virtual namespace is a virtual directory, and whether the virtual namespace is a physical directory.

TABLE 2

| VIRTUAL NAMESPACE | PHYSICAL NAMESPACE | VIRTUAL DIRECTORY? | PHYSICAL DIRECTORY? |
|---|---|---|---|
| http://server/newdir1/ | E:\root\newdir1\ | No | Yes |
| http://server/newdir1/subdir1/ | G:\sample\stuff\info\ | Yes | No |
| http://server/newdir1/subdir2/ | E:\root\newdir1\subdir2\ | No | Yes |
| http://server/newdir1/subdir3/ | C:\ | Yes | No |

The virtual namespace "http://server/newdir1/" is not a virtual namespace because it has no corresponding mapping in the data structure 200 of FIG. 2. Instead, the corresponding physical namespace is obtained by derivation from the parent directory "http://server/" as explained above.

Figure 5B:
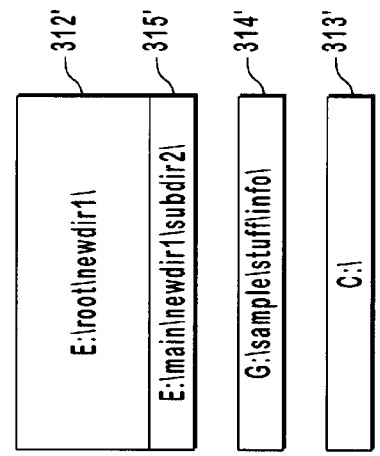
FIG. 5B schematically illustrates an example data structure that represents the physical namespaces corresponding to the example destination directory of FIG. 3B.

Note that the destination physical namespaces are also not contiguous. The relationship of the destination physical namespaces of Table 2 is shown in FIG. 5B. Although the physical namespace 312' corresponding to the destination directory virtual namespace "http://server/newdir1/" is contiguous with the physical namespace 314' of one of its subdirectories "http://server/newdir1/subdir2/", there are no other physical namespaces that are contiguous.

Figure 6:
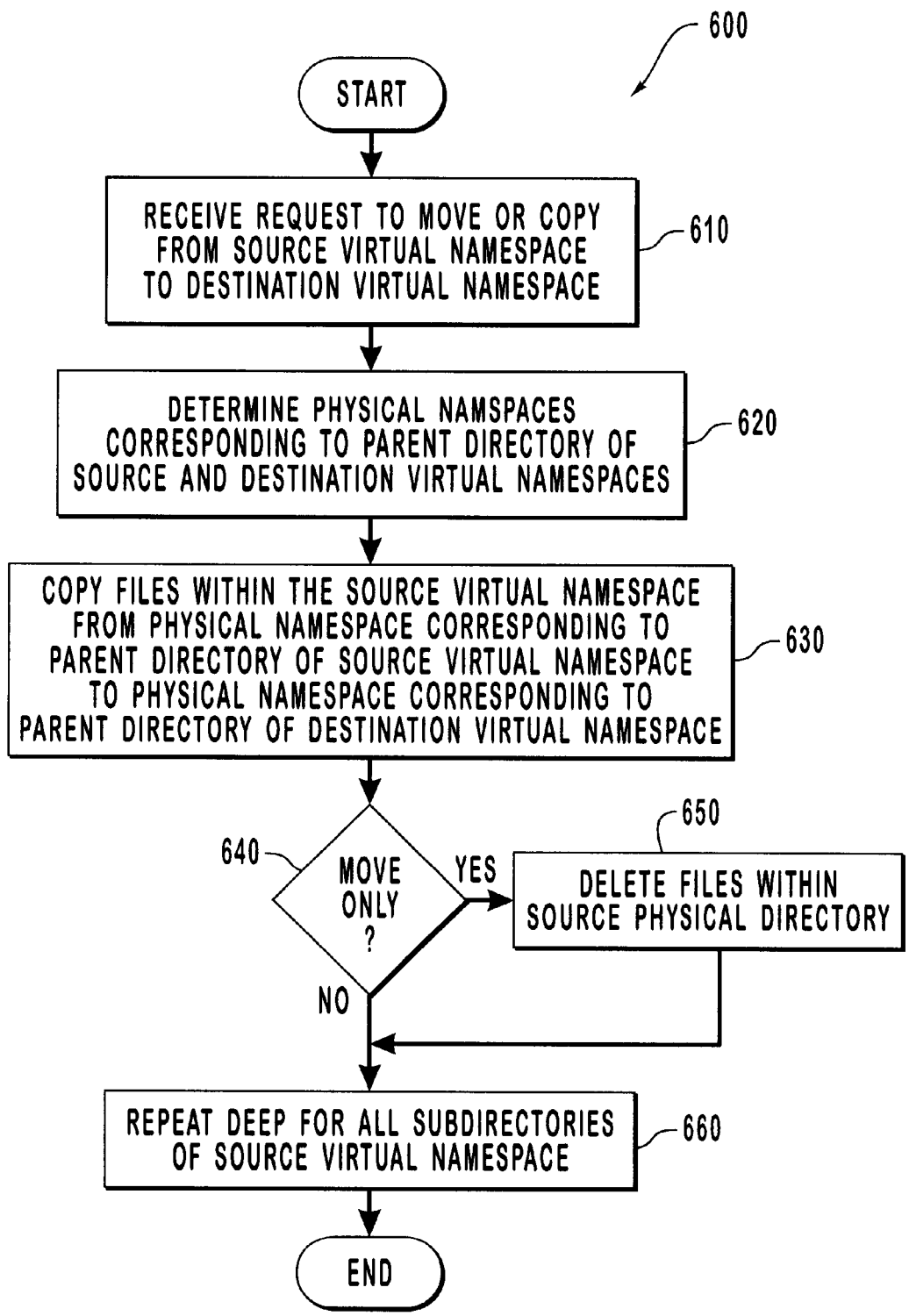
FIG. 6 is a flowchart of an overall method for copying or moving directories across virtual namespaces.

FIG. 6 illustrates an overall method 600 of moving or copying directories of virtual namespaces across virtual namespaces in accordance with the present invention. The method 600 represents an example of a means or step for copying or moving the directory from a source virtual namespace associated with the one or more source physical namespaces to a destination virtual namespace associated with the one or more destination physical namespaces.

First, step 610 receives a request to move or copy a directory from a source virtual namespace to a destination virtual namespace. Accordingly, embodiments within the scope of the present invention include a means or step for receiving a request to move or copy a directory from a source virtual namespace to a destination virtual namespace.

Any request indicating such a express or implied copy or move indication will suffice. The request may be generated by a remote computer such as the remote computers 149a or 149b of FIG. 1 or any other computer capable of generating and transmitting such a request and then transmitted in any possible fashion to a local computer that processes the request such as the computer 120 of FIG. 1 or any other computer capable of receiving such a request.

The request may be received in any possible fashion such as over Plain-Old Telephone Service (POTS), cable, satellite, Integrated Services Digital Network (ISDN), T-1 connection, T-2 connection, T-3 connection, a Local Area Network (LAN), a Wide Area Network (WAN) or in any other manner. It is not important to the present invention how the request is received. All that is required is that the component responsible for controlling the copy or move request receive that request.

The copy or move request may also be generated locally. Thus, the request may be an Application Program Interface (API) call by another module within the computer. Also, the local module may transmit the request to the module that controls the move or copy in a fashion other than by making an API call.

Once the request is received (step 610), step 620 determines the physical namespace corresponding to the parent directory of the source and destination virtual namespaces. Embodiments within the scope of the present invention include a means and step for determining the physical namespace corresponding to directories of the virtual namespace. One possible means and step was described above with reference to FIG. 4 in order to present the best mode of the present invention. However, any method for determining the physical namespace will suffice and falls within the scope of the present invention.

In the specific example, step 720 determines that the source directory virtual namespace "http://server/dir1/" 302 corresponds to the physical namespace "C:\main\directory1\" 302' and the destination directory virtual namespace "http://server/newdir1/" 312 corresponds to the physical namespace "E:\root\newdir1\" in the manner described above.

Once the physical namespaces for the directory are determined, step 630 copies all of the files directly under the source directory virtual namespace "http://server/dir1/", that is to say all of the files directly under the corresponding physical namespace "C:\main\directory1\" are copied to the physical namespace "E:\root\newdir1\" corresponding to the destination directory virtual namespace "http://server/newdir1/. Note that this includes files directly underneath the directory, not files underneath subdirectories within the directory.

It is first necessary to read a file from the source directory before copying that file from the source directory. This may typically be done over HTTP or WEBDAV with a "GET" method in the HTTP request. Sometimes, however, the file to be read is an executable file. Very often, a computer having such an executable file will run the executable file and return the results of the execution in response to a "GET" command for that file. This is undesirable since the file itself is to be copied or moved, not the results of the execution of that file. To avoid this result, a "TRANSLATE" header or other indication may be provided with the request that indicates to the server that the file itself is to be retrieved, not the execution results of the file. A TRANSLATE header is described in further detail in co-pending U.S. application Ser. No. 09/360,515, filed Jul. 26, 1999 and entitled "Accessing Sources of Resources Within Standard Request-Response Protocols" which is incorporated herein by reference. Once the file is retrieved, the file is copied to the destination physical namespace.

If the operation is a move operation as in the example (YES in decision block 640), all of the files within the source physical namespace "C:\main\directory1\" are deleted. These files are deleted one by one immediately after each file is copied to the destination physical directory.

If the destination virtual namespace "http://server/newdir1/" did not exist before the move or copy, the move or copy operation would include creating the directory "newdir1/" under the virtual namespace "http://server/". Similarly, if the destination physical namespace "E:\root\newdir1\" did not exist before the move or copy, the move or copy operation would include creating the directory "newdir1/" under the physical namespace "E:\root\".

Step 660 repeats steps 620, 630, 640 and 650 for each subdirectory under the source directory.

For example, step 620 determines that the virtual namespace "http://server/dir1/subdir1/" corresponds to physical namespace "G:\sample\" and that the virtual namespace "http://server/newdirw/subdir1/" corresponds to the physical namespace "G:\sample\stuff\info\". Accordingly, step 630 copies all of the files directly underneath the physical namespace "G:\sample\" into the physical namespace "G:\sample\stuff\info\". Steps 640 and 650 combine to delete the files from the physical namespace "G:\sample\" as they are copied.

In addition, step 620 determines that the virtual namespace "http://server/dir1/subdir2/" corresponds to physical namespace "C:\main\directory1\subdir2\" and that the virtual namespace "http://server/newdir1/subdir2/" corresponds to the physical namespace "E:\root\newdir1\subdir2\". Accordingly, step 630 copies all of the files directly underneath the physical namespace "C:\main\directory1\subdir2\" to "E:\root\newdir1\subdir2\". In a move operation, steps 640 and 650 combine to delete the files from the physical namespace "C:\main\directory1\subdir2\".

Finally, step 620 determines that the virtual namespace "http://server/dir1/subdir3/" corresponds to physical namespace "C:\main\directory1\subdir3\" and that the virtual namespace "http://server/newdir1/subdir3/" corresponds to the physical namespace "C:\". Accordingly, step 630 copies all of the files directly underneath the physical namespace "C:\main\directory1\subdir3\" to "C:\". Steps 640 and 650 combine to delete the files from the physical namespace "C:\main\directory1\subdir3\".

Figure 7:
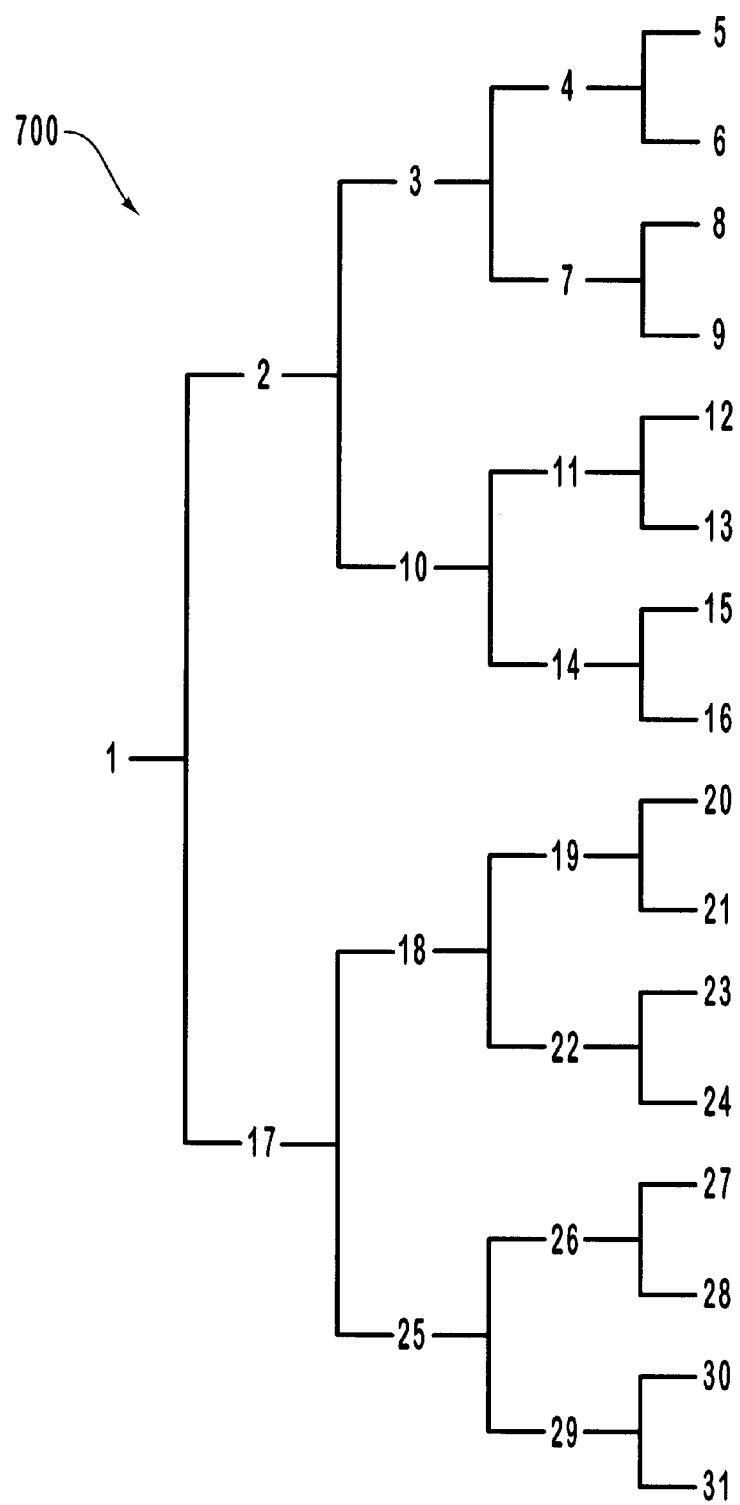
FIG. 7 is a tree-like directory structure illustrating the deep sequence for examining directories and subdirectories when copying or moving.

Step 660 analyzes the subdirectories in a "deep" fashion meaning that all subdirectories with a parent subdirectory would be handled before moving on to other subdirectories at the same level as the parent. This would be true at all subdirectory levels. FIG. 7 shows a hypothetical directory tree structure 700 with numbers replacing the directory titles. The numbers indicate the order that the directories would be handled according to the method 600 of FIG. 6.

In this manner, the entire source directory virtual namespace "http://server/dir1/" is moved to the destination virtual namespace "http://server/newdir1/". From the users viewpoint, the operation was very simple as it involved only the generation of a single copy or move request. However, the above-described complexities are performed automatically without requiring any further input from the user. The copying or moving according to the above method is successful even if one or both of the source or destination directory virtual namespace corresponds to non-contiguous physical namespaces. Furthermore, the method is successful if both the source and destination directory virtual namespaces correspond to contiguous physical namespaces.

If a user tries to copy or move from or to a directory that the user should not have access to, the request fails and the computer returns an error message in the response. If, however, the user should not have access to only one or more of the subdirectories underneath that directory, the computer may complete the requested operation for as many subdirectories as permissible. The computer would return an error message to the requestor along with any other allowable information that might be helpful to the requester. Such information might include, for example, the subdirectory names for which access is denied.

The copying and moving of the files themselves may be insufficient to complete the copy or move operation. In some systems, each file that exists within that system has a corresponding entry in a database or "metabase" that includes information about the file. Such information might include, for example, the content type of the file.

It is important in the context of communications in HTTP to keep track of the content type of files that could be retrieved by a client computer since HTTP responses should include an indication of the content type of the file being retrieved. As a file is copied or moved, an entry corresponding to the new physical namespace to which the file was copied or moved is created in the metabase. Then, the entry is populated with information about the file such as the content type of the file. Thus, important information about the file survives the copy or move operation in the database.

The above describes methods and systems for moving and copying from a source virtual namespace to a destination virtual namespace, whether or not the source and virtual namespaces correspond to contiguous or non-contiguous physical namespaces. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system having access to resources identified by corresponding physical namespaces, a method of copying or moving a collection of resources from a source virtual namespace to a destination virtual namespace without requiring a requester of a move or copy operation to indicate the physical namespaces associated with the virtual namespaces, the method comprising the following:

a specific act of receiving a request to copy or move a collection of resources from a source virtual namespace associated with one or more physical namespaces to a destination virtual namespace associated with one or more destination physical namespaces; and a step for copying or moving the collection from the source virtual namespace associated with the one or more source physical namespaces to the destination virtual namespace associated with the one or more destination physical namespaces.

2. The method according to claim 1, wherein:

the one or more destination physical namespaces are non-contiguous; and the one or more source physical namespaces are non-contiguous.

3. The method according to claim 1, wherein:

the one or more destination physical namespaces are non-contiguous; and the one or more source physical namespaces are contiguous.

4. The method according to claim 1, wherein:

the one or more destination physical namespaces are contiguous; and the one or more source physical namespaces are non-contiguous.

5. The method according to claim 1, wherein:

the one or more destination physical namespaces are contiguous; and the one or more source physical namespaces are contiguous.

6. The method according to claim 1, wherein:

the source and destination virtual namespaces are organized in a tree-like directory structure.

7. The method according to claim 6, wherein:

the source and destination virtual namespaces are each a uniform resource identifier.

8. The method according to claim 1, wherein:

the source and destination physical namespaces are organized in a tree-like directory structure.

9. The method according to claim 8, wherein:

the source and destination physical namespaces are each a file system path.

10. The method according to claim 1, wherein:

the request complies with a request/response protocol.

11. The method according to claim 1, wherein:

the source virtual namespace contains a plurality of source virtual subdirectory namespaces.

12. The method according to claim 11, wherein the step for copying or moving further comprises the following for the source virtual namespace and for each source virtual subdirectory namespace of the source virtual namespace:

a specific act of determining a source physical namespace corresponding to the source virtual namespace;

a specific act of determining a destination physical namespace corresponding to a destination virtual namespace; and a specific act of copying files from the source physical namespace to the destination physical namespace.

13. The method according to claim 12, wherein the step for copying or moving further comprises the following for the source virtual namespace and for each source virtual subdirectory namespace of the source virtual namespace:

if the request is for a move operation, a specific act of deleting the source physical namespace.

14. A computer-readable medium having computer executable instructions for performing the specific act and step recited in claim 1.

15. In a computer system having access to resources identified by corresponding physical namespaces, a method of copying or moving a collection of resources from a source virtual namespace to a destination virtual namespace without requiring a requester of a move or copy operation to indicate the physical namespaces associated with the virtual namespaces, the method comprising the following:

- a specific act of receiving a request to copy or move a collection of resources from a source virtual namespace associated with one or more physical namespaces to a destination virtual namespace associated with one or more destination physical namespaces;
- a specific act of determining the source physical namespace corresponding to the source virtual namespace;
- a specific act of determining the destination physical namespace corresponding to the destination virtual namespace;
- a specific act of copying files from the source physical namespace to the destination physical namespace; and
- a specific act of repeating the specific act of determining the source physical namespace, determining the destination physical namespace, and copying files from the source physical namespace to the destination physical namespace for at least some of the source virtual subdirectory namespaces within the source virtual namespace.

16. The method according to claim 15, wherein:

the one or more destination physical namespaces are non-contiguous; and the one or more source physical namespaces are non-contiguous.

17. The method according to claim 15, wherein:

the one or more destination physical namespaces are non-contiguous; and the one or more source physical namespaces are contiguous.

18. The method according to claim 15, wherein:

the one or more destination physical namespaces are contiguous; and the one or more source physical namespaces are non-contiguous.

19. The method according to claim 15, wherein:

the one or more destination physical namespaces are contiguous; and the one or more source physical namespaces are contiguous.

20. The method according to claim 15, wherein:

the source and destination virtual namespaces are organized in a tree-like directory structure.

21. The method according to claim 20, wherein:

the source and destination virtual namespaces are each a uniform resource identifier.

22. The method according to claim 15, wherein:

the source and destination physical namespaces are organized in a tree-like directory structure.

23. The method according to claim 22, wherein:

the source and destination physical namespaces are each a file system path.

24. The method according to claim 15, wherein:

the request complies with a request/response protocol.

25. The method according to claim 15, wherein the step for copying or moving further comprises the following for the source virtual namespace and for each source virtual subdirectory namespace of the source virtual namespace:

if the request is for a move operation, a specific act of deleting the source physical namespace.

26. The method according to claim 15, wherein the specific act of repeating comprising the following:

a specific act of repeating the specific act of determining the source physical namespace, determining the destination physical namespace, and copying files from the source physical namespace to the destination physical namespace for all of the source virtual subdirectory namespaces within the source virtual namespace.

27. The method according to claim 15, wherein the at least some of the source virtual subdirectory namespace include those subdirectory namespace for which the requester has permission to move or copy.

28. A computer-readable medium having computer executable instructions for performing the specific acts recited in claim 15.

* * * * *

UNITED STATES PATENT AND TRADEMARK OFFICE
CERTIFICATE OF CORRECTION

PATENT NO. : 6,408,298 B1
DATED : June 18, 2002
INVENTOR(S) : Van C. Van and Joel M. Soderberg It is certified that error appears in the above-identified patent and that said Letters Patent is hereby corrected as shown below:

Title page,
Item [57], ABSTRACT,
Line 7, after "computer system" delete "the computer system"

Signed and Sealed this

Fourth Day of March, 2003

JAMES E. ROGAN
*Director of the United States Patent and Trademark Office*